Feb. 3, 1959   J. S. MICHIE ET AL   2,871,793
ELECTRIC MOTOR AND PUMP COMBINATION
Filed June 29, 1956   2 Sheets-Sheet 1

INVENTORS.
JOHN S. MICHIE
AND WILLIAM E. SPRINGER,
BY
ATTORNEYS.

Feb. 3, 1959 J. S. MICHIE ET AL 2,871,793
ELECTRIC MOTOR AND PUMP COMBINATION
Filed June 29, 1956 2 Sheets-Sheet 2
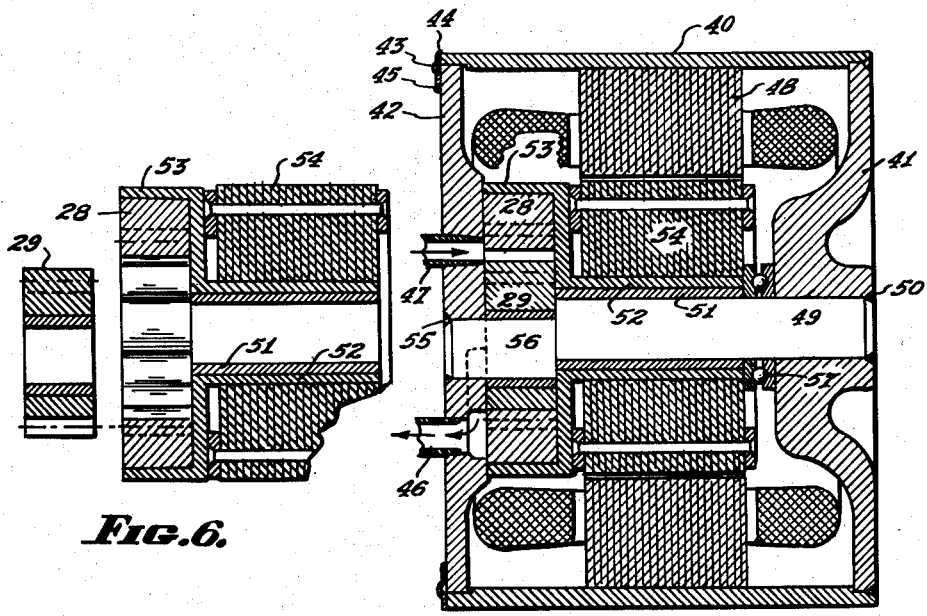
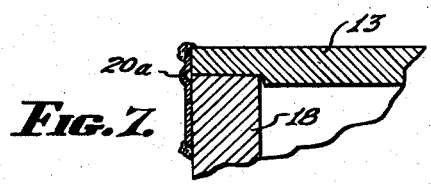
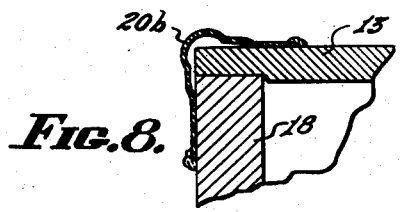
INVENTORS.
JOHN S. MICHIE
AND WILLIAM E. SPRINGER,
BY
ATTORNEYS.

United States Patent Office 2,871,793
Patented Feb. 3, 1959

2,871,793

ELECTRIC MOTOR AND PUMP COMBINATION

John S. Michie and William E. Springer, Springfield, Ohio, assignors to Robbins & Myers, Inc., Springfield, Ohio, a corporation of Ohio Application June 29, 1956, Serial No. 594,741

12 Claims. (Cl. 103—118)

This invention relates to an electric motor and pump combination. Since a compressor is actually only a special case of a pump, the invention is equally applicable to an electric motor and compressor combination. For convenience in describing the construction, we shall use the terms "pump" and "electric motor and pump combination" and we shall also use this language in the claims, but it is to be understood that the term "pump" as used herein is inclusive of a compressor.

There are many applications for electric motor driven pumps and compressors where it is desired to seal the entire unit and various attempts have been made in the prior art to produce a combined electric motor and pump sealed into a container such that the entire unit could be submerged if desired.

It has also been proposed to incorporate a pump within the stator of an electric motor. Various pump arrangements lend themselves particularly well to such a construction. Among pumping elements which are particularly well adapted for this use are the so-called "Rotoid" elements. The name "Rotoid" is a trademark identifying pump elements such as are described and claimed in the Hill patent, No. 2,547,392 dated April 3, 1951. A number of other Hill patents also disclose similar pumping elements which may be used in the present invention.

In the pumping elements known as Rotoids, there is an external pumping element comprising an internally toothed gear which rotates on its own axis and within the internal toothed gear and meshing therewith is a toothed pinion arranged to rotate on an axis eccentric to the ring gear axis. Rotation of the annular gear drives the pinion and produces a pumping action. By appropriate placement of ports and proper design of the cooperating teeth, the device may constitute a pump or a compressor.

It has been proposed to incorporate the ring gear within the rotor of an electric motor so that if the motor rotor rotates, the ring gear is rotated. In this way, the entire pump or compressor can be incorporated within the motor rotor and thus a combined motor and pump or motor and compressor unit may be provided which for a given capacity is considerably smaller than any other conventional type of motor pump or motor compressor unit.

It has been proposed to embed the motor stator in plastic to constitute a cylindrical shell which may be closed by suitable end plates sealed to the shell so that except for the recess ports, the entire unit is completely sealed and constitutes a pressure vessel.

Various difficulties are encountered in connection with the plastic used which is fairly expensive and it is, therefore, an object of the present invention to provide for a metallic casing for a motor and pump unit which will constitute a pressure tight vessel.

This primary object and various ancillary objects which will be described in more detail hereinafter or which will become apparent as the specification proceeds, we accomplish by that construction and arrangement of parts of which we shall now disclose certain exemplary embodiments.

Reference is made to the drawings forming a part hereof and in which:

Figure 5 is a view similar to Figure 2 showing another embodiment of the invention.

Figure 6 is an exploded view similar to Figure 5 showing the motor rotor and pump structure in greater detail.

Figures 7 and 8 are fragmentary cross-sectional views showing modified annular spring members.

Briefly, in the practice of our invention we provide an electric motor stator tightly fitting within a cylindrical shell of metal. The shell is closed at its two ends by end plates. One end plate is annularly welded to the shell so as to be fixedly secured thereto. The other end of the shell is provided with an internal rabbet within which the other end plate fits slidingly. The latter end plate, which is indirectly secured to the first end plate, is sealed by one of a number of means with respect to the casing. In this manner as a result of expansion of certain parts within the unit due to heat, the last named end plate is capable of moving outwardly within the rabbet without disturbing the pressure tight relationship of the parts.

Figure 1:
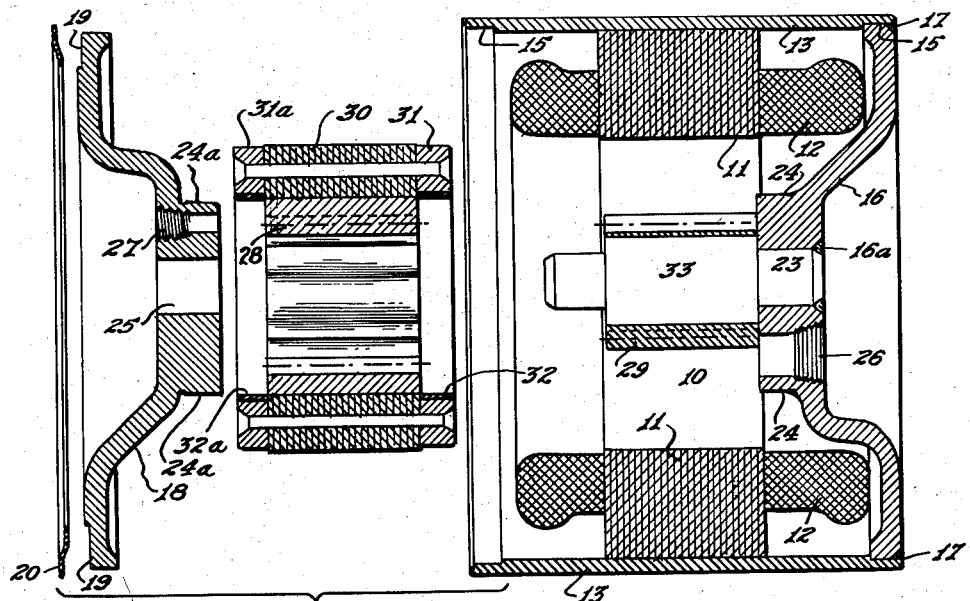
Figure 1 is an exploded view in cross section of one embodiment of the invention.
Figure 4:
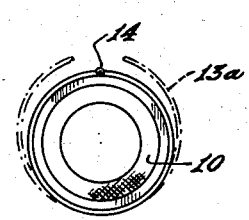
Figure 4 is an end elevation of the motor stator and shell showing the manner in which the shell is assembled to the stator.

Referring now in greater detail to the drawings, we have shown in Figure 1 an electric motor stator indicated generally at 10 and comprising a series of annular laminations 11 and windings 12. The stator 10 fits tightly within the cylindrical shell 13. The assembly of the stator 10 and the shell 13 may be accomplished in any desired manner but we prefer to accomplish it as indicated in Figure 4 somewhat diagrammatically, where a strip of metal indicated in broken lines at 13a is wrapped around the stator 10 and welded along the line of juncture as at 14. Suitable clamps may clamp the sheet 13a in position for welding and after welding the seam 14 may be ground down flush if desired.

The shell is provided preferably at each end with an annular rabbet 15 to accept the end plates. The end plate 16 is simply fitted into the rabbet 15 and welded annularly to the shell 13 as indicated at 17. The other end plate 18 fits slidingly in its rabbet 15 and is, in its turn, preferably rabbeted as at 19. The end plate 18 is yieldably sealed by means of an annular spring member 20, which is annularly welded to the shell 13 at 21 and is also annularly welded to the end plate 18 as at 22. It will be clear that the end plate 18 is thus capable of limited sliding movement axially of the shell 13 while retaining at all times the pressure tight relationship of the parts. Thus, if expansion of parts makes it necessary, the end plate 18 may move slightly to the left and upon cooling, it will again return to its original position.

Figure 2A:
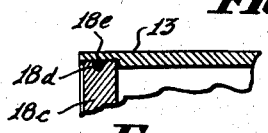
Figure 2a is a fragmentary view similar to Figure 2, showing a modification.
Figure 2:
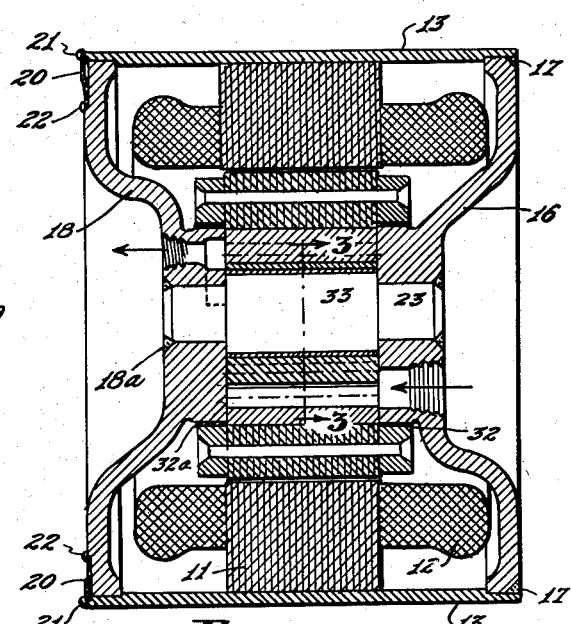
Figure 2 is a view similar to Figure 1 but showing the unit fully assembled.

In the embodiment of Figures 1 and 2, the end plate 16 is provided with a fixed shaft member 23 welded to the end plate 16 as at 16a, disposed eccentrically of the shell 13 and with a bearing boss 24 which is concentric with respect to the shell 13 and the stator 11. The end plate 18 likewise is provided with a bearing boss 24a concentric with the shell and with a bore 25 eccentric thereto. The bore 25 is arranged to receive the opposite end of the fixed shaft 23, which is welded thereto as at 18a, when the parts are assembled as seen in Figure 2. Additionally, the end plate 16 may be provided with a port 26 and the plate 18 may be provided with a port 27. The location of the ports does not form a part of the present invention and it will be understood that both ports may be located in one end plate with the other end plate being imperforate.

Figure 3:
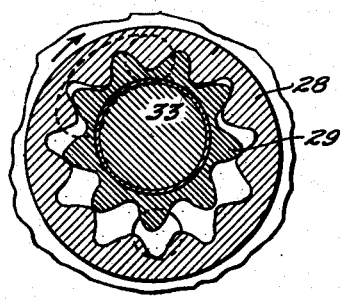
Figure 3 is a fragmentary cross-sectional view taken on the line 3—3 of Figure 2, slightly enlarged.

The pumping elements do not, except as specified in certain claims, constitute a limitation upon the invention but we prefer to use the Rotoid elements mentioned above. Such elements are shown in Figure 3 and comprise the outer element 28 and the inner element 29.

The motor rotor is indicated at 30 and secured to the opposed end faces of the rotor 30 are the bearing rings 31 and 31a having the bearing surfaces 32 and 32a. In the assembly of the device, the bearing surfaces 32 bear on the bearing boss 24 while the bearing surface 32a bears on the bearing boss 24a as best seen in Figure 2. Since the bearing rings 32 and 32a are supported by the rings 31 and 31a, the bearing parts, including the bearing surfaces 24 and 24a, have little effect on the magnetic flux in the motor rotor. Tightly press-fitted within the stator 30 is the external pumping element 28 which thus is constrained to rotate with the rotor of the electric motor on the central axis of the shell.

The fixed shaft 32 has an enlarged central bearing portion 33 and the inner pumping element 29 is rotatably arranged on this enlarged bearing portion 33 so that as the motor rotor rotates the annular gear 28 drivingly and pumpingly engages the pinion 29.

In the modification of Figure 2a, the end plate 18c is sealed to the casing 13 by means of an O-ring. To this end the plate 18c is provided with the annular groove 18d, within which is seated the O-ring 18e. Again it will be clear that as expansion and contraction take place, the plate 18c may move outwardly and inwardly while the O-ring 18e maintains the seal.

In the modification of Figures 5 and 6, the casing construction is substantially the same as that of Figures 1 and 2, but the pumping elements are no longer located within the motor rotor. In this embodiment we again have the shell 40 to which the end plate 41 is annularly welded. The end plate 42 is again seated slidingly in a rabbet and held in position by an annular spring 43 which is welded to the shell as at 44 and to the end plate as at 45. This embodiment also illustrates how the ports 46 and 47 may both be provided in one end plate, in this instance the end plate 42 with the end plate 41 imperforate.

The motor stator may be secured in position within the shell 40 in the same manner as in the embodiment of Figures 1 and 2. In this embodiment, however, we provide a shaft element 49 secured as by welding at 50 to the end plate 41. The shaft element 49 is concentric with the shell. The shaft 49 may carry a bearing sleeve 51 and on this sleeve 51 there is a sleeve 52 having at one end the cup-like extension 53. The motor rotor 54 is tightly pressed onto the sleeve 52 so that as the motor rotor 54 rotates, the cup-like member 53 also rotates.

The external pumping element 28 is press-fitted into the cup-like extension 53 so as to rotate as before, concentrically with the motor rotor.

Secured to the end plate 42, as by welding at 55, is a shaft element 56 which is eccentric to the shaft element 49 and the shaft element 56 rotatably carries the pumping element 29.

We have indicated a thrust bearing at 57 which may be found necessary and while we have indicated the shaft elements 49 and 56 by separate numerals, it will be clear that they can be formed integrally of a single piece of stock.

The principal advantage of the structure of Figures 5 and 6 is that the motor rotor has its rotative bearing on a smaller diameter so that the bearing friction is somewhat reduced over that encountered in the structure of Figures 1 and 2.

It will be understood that the embodiment of Figures 5 and 6 may have a sealing structure like that of Figure 2a if desired.

In Figures 7 and 8, we have shown modifications 20a and 20b of the spring member 20. In all the embodiments, the spring member is annularly welded to the shell and is also annularly welded to the end plate.

From the foregoing description the invention will be clearly understood and it will be appreciated that numerous modifications may be made without departing from the spirit of the invention. It will therefore be clear that we do not intend to limit ourselves except as set forth in the claims which follow.

Having now fully described our invention, what we claim as new and desire to secure by Letters Patent is:

1. An electric motor and pump combination comprising a cylindrical metallic shell, an end plate tightly closing one end of said shell and annularly welded thereto, the other end of said shell having an internal annular rabbet, an end plate snugly seated in said rabbet for sliding movement therein axially of said shell, means securing said last named end plate to said first named end plate, and yieldable means for sealing said last named end plate to said shell, a pump within said shell, said pump having an exhaust port located in a said end plate and an inlet port located in a said end plate, and an electric motor driving said pump disposed within said shell, said combination constituting a pressure tight vessel.

2. A structure according to claim 1, wherein said sealing means comprise an annular external groove in said second named end plate and an O-ring seated in said groove.

3. An electric motor and pump combination comprising a cylindrical metallic shell, an end plate tightly closing one end of said shell and annularly welded thereto, the other end of said shell having an internal annular rabbet, an end plate snugly seated in said rabbet for sliding movement therein axially of said shell, means securing said last named end plate to said first named end plate, and an annular spring member annularly welded to said shell and also annularly welded to said last named end plate, a pump within said shell, said pump having an exhaust port located in a said end plate and an inlet port located in a said end plate, and an electric motor driving said pump disposed within said shell, said combination constituting a pressure tight vessel.

4. An electric motor and pump combination comprising a cylindrical metallic shell having a motor stator tightly fitting therein, an end plate tightly closing one end of said shell and annularly welded thereto, said end plate having means to provide a bearing for a motor rotor, a motor rotor arranged for rotation on said bearing means, a pumping element associated with said motor rotor to rotate therewith, a cooperating pumping element rotatably mounted eccentric to the axis of said first named pumping element, said shell having at its open end an annular rabbet, an end plate snugly seated in said rabbet for sliding movement therein axially of said shell, means securing said last named end plate to said first named end plate, and yieldable means sealing said last named end plate to said shell, said pump having an exhaust port located in a said end plate and an inlet port located in a said end plate and said combination constituting a pressure tight vessel.

5. A structure according to claim 4, wherein said sealing means comprise an annular external groove in said last named end plate and an O-ring seated in said groove.

6. A structure according to claim 4, wherein said sealing means comprises an annular spring member annularly welded to said shell and also annularly welded to said last named end plate.

7. An electric motor and pump combination comprising a cylindrical metallic shell having a motor stator tightly fitting therein, an end plate tightly closing one end of said shell and annularly welded thereto, said end plate having within said shell a bearing boss concentric to said stator and a shaft eccentric to said stator and fixed to said end plate, the other end of said shell having an internal annular rabbet, a second end plate snugly seated in said rabbet for sliding movement therein axially of said shell and fixed to said fixed shaft, yieldable means sealing said second end plate to said shell, said second end plate also having a concentric inwardly directed bearing boss and an eccentric support for the said eccentric fixed shaft, a motor rotor having bearing surfaces engaging said bearing bosses and having on its inside a pumping element tightly fitting therein, and a cooperating pumping element rotatably mounted on said eccentric fixed shaft, said pump having an exhaust port located in a said end plate and an inlet port located in a said end plate, said combination constituting a pressure tight vessel.

8. A structure according to claim 7, wherein said sealing means comprises an annular external groove in said second end plate and an O-ring seated in said groove.

9. A structure according to claim 7, wherein said sealing means comprises an annular spring member annularly welded to said shell and also annularly welded to said second end plate.

10. An electric motor and pump combination comprising a cylindrical metallic shell having a motor stator tightly fitting therein, an end plate tightly closing one end of said shell and annularly welded thereto, said end plate carrying a shaft concentric to said stator and fixed to said end plate, a sleeve having a bearing on said fixed shaft and carrying a motor rotor, said sleeve having a cup-like extension concentric to said stator, a pumping element fitting tightly in said cup-like extension to be driven by said rotor, the other end of said shell having an internal annular rabbet, a second end plate snugly seated in said rabbet for sliding movement therein axially of said shell, yieldable means for sealing said second end plate to said shell, said second end plate carrying a shaft eccentric to said stator, fixed with respect to said second end plate and secured to said concentric shaft, a cooperating pump element mounted on said fixed eccentric shaft, said second end plate having an intake port and an exhaust port, said combination constituting a pressure tight vessel.

11. A structure according to claim 10 wherein said sealing means comprises an annular external groove in said second end plate and an O-ring seated in said groove.

12. A structure according to claim 10, wherein said sealing means comprises an annular spring member annularly welded to said shell and also annularly welded to said second end plate.

References Cited in the file of this patent

UNITED STATES PATENTS

| | | |
|---|---|---|
| 1,759,766 | Szmuckler | May 20, 1930 |
| 2,018,521 | Heitman | Oct. 22, 1935 |
| 2,089,626 | Smith | Aug. 10, 1937 |
| 2,140,966 | Nichols | Dec. 20, 1938 |
| 2,178,425 | Johnson | Oct. 31, 1939 |
| 2,285,050 | Pezzillo | June 2, 1942 |
| 2,324,434 | Shore | July 13, 1943 |
| 2,693,313 | McAdam | Nov. 2, 1954 |
| 2,695,070 | Geyer et al. | Nov. 23, 1954 |
| 2,711,286 | McAdam | June 21, 1955 |

FOREIGN PATENTS

| | | |
|---|---|---|
| 482,826 | Germany | Sept. 20, 1929 |